United States Patent
Heinila (10) Patent No.: US 7,346,097 B2
(45) Date of Patent: Mar. 18, 2008

(54) DATA TRANSMISSION METHOD AND RECEIVER

(75) Inventor: Marko Heinila, Santa Fe, NM (US)

(73) Assignee: Nokia Corporation, Espoo (FI)

( * ) Notice: Subject to any disclaimer, the term of this patent is extended or adjusted under 35 U.S.C. 154(b) by 641 days.

(21) Appl. No.: 10/848,357

(22) Filed: May 19, 2004

(65) Prior Publication Data
US 2004/0214546 A1   Oct. 28, 2004

Related U.S. Application Data

(63) Continuation of application No. PCT/FI02/01015, filed on Dec. 12, 2002.

(30) Foreign Application Priority Data
Dec. 14, 2001  (FI) .................. 20012475

(51) Int. Cl.
*H04B 1/00* (2006.01)
(52) U.S. Cl. ...................... 375/148; 375/150
(58) Field of Classification Search ........ 375/142–144, 375/147–150, 343, 348–349; 342/357.04, 342/357.07, 357.08, 357.12
See application file for complete search history.

(56) References Cited

U.S. PATENT DOCUMENTS

| 5,459,473 A | * | 10/1995 | Dempster et al. | ...... 342/357.12 |
| 6,198,765 B1 | * | 3/2001 | Cahn et al. | ................. 375/142 |
| 6,229,839 B1 | | 5/2001 | Levin et al. | |

FOREIGN PATENT DOCUMENTS

| FI | 20002391 | 5/2002 |
| WO | WO 97/28608 | 8/1997 |
| WO | WO 00/41327 | 7/2000 |
| WO | WO 02/37711 | 5/2002 |

\* cited by examiner

*Primary Examiner*—Khanh C. Tran
(74) *Attorney, Agent, or Firm*—Squire, Sanders & Dempsey LLP (57) ABSTRACT

A method for setting spreading code delays in RAKE receiver branches include, for instance: determining solutions for the code delays that include a code delay candidate for the branch to be processed and for in the order of delay preceding branches. The solutions maximize the sum of the signal strengths in the branch to be processed and in the preceding branches. The method also includes that the delays of the branches are selected in accordance with the last determined solution.

28 Claims, 5 Drawing Sheets

DATA TRANSMISSION METHOD AND RECEIVER

This is a Continuation of Intenational Application No. PCT/FI02/01015 filed Dec. 12, 2002, which designated the U.S. and was published under PCT Article 21(2) in English.

FIELD

The invention relates to a method for setting delays for RAKE receiver branches.

BACKGROUND

The propagation conditions of radio waves typically vary constantly in radio systems, such as cellular radio systems, which causes variation to the radio signal as a function of time and place, i.e. fading. The changes occurring in the channel impulse response may result from the physical changes in a medium (for instance owing to the variation of the refractive index in the medium as a function of temperature, pressure and partial pressure of vapour) or from changes in the geometry of a link (the movement of a transmitter or receiver or an obstacle on the link).

One signal fading mode, fast fading, arises from multipath propagation characteristic for the cellular radio environment, wherein a signal propagates along various paths between a transmitter and a receiver. Such a channel is referred to as a Rayleigh fading channel (including only multipath propagated signal components) or as a fading Rice channel (the received signal also including a stable, or directly propagated, or strongly mirror-reflected part).

The multipath propagated signal components are of different phases in the receiver, since they have proceeded along different propagation paths. Such signal components of different phases are utilized in a RAKE receiver. When the signal components received by different branches are combined, the energy of the received signal is maximized. The RAKE receiver typically comprises several branches, whose delays are for example set to correspond with the delays of different signal components measured from the impulse response of the channel. Methods for setting delays for RAKE receivers are referred to as code phase acquisition or code acquisition methods and code tracking methods. Typically, a code is first searched for, and thereafter code tracking is carried out, where the delay values set during the search for code phase are specified. Patent publication FI982856, or patent publication WO00/41327, discloses a prior art code phase acquisition method of the RAKE receiver, which is incorporated here by reference.

RAKE receivers are for instance used in the UMTS system (Universal Mobile Telecommunications System), in which the frequency resource is divided into use by means of Code Division Multiple Access (CDMA), which is a broadband data transmission system. In a broadband system, the narrowband data signal of a user is modulated with a spreading code, which is more broadband than the data signal, on a fairly broad band. In the UMTS system, several users simultaneously send on the same frequency band and the data signals are separated from one another in the receivers based on a pseudorandom spreading code.

The spreading code is generally generated from a long preudorandom bit sequence. The bit rate of the spreading code is much higher than that of the data signal, and in order to distinguish the spreading code bits from the data bits and symbols they are referred to as chips. Each data symbol of a user is multiplied by spreading code chips. Thus, the narrowband data signal spreads over the frequency band used by the spreading code. The spreading code may include one or more data bits.

In the CDMA systems the RAKE receiver is synchronized with the spreading code sequence signal component specifically. Then, in order to perform code phase acquisition and code tracking the spreading code generator of the receiver is typically synchronized in accordance with the delay values obtained from the maximum points of the impulse response. A problem with the synchronizer, i.e. in setting the delays, is that code phase acquisition and code tracking require a lot of calculation capacity owing to the large number of samples. The impulse response also changes as a function of time. In addition, when the impulse response does not include distinct maximum points, but the impulse response comprises a broad power maximum region, in other words a fat finger situation, achieving the synchronization is difficult on the basis of an impulse response determined from a signal component received by one branch in accordance with the prior art and in general some of the energy of the received signal is lost.

BRIEF DESCRIPTION

It is an object of the invention to provide an improved method and an improved apparatus. As an aspect of the invention there is provided a method for setting spreading code delays in RAKE receiver branches by determining the strength of a multipath propagated signal in a set of propagation delay points in the surroundings of each RAKE branch, restricting the code delay change in each branch so that the changed delay is within an area, in which the signal strength can be estimated by virtue of measurements, restricting the differences between the code delays in the branches to exceed a pre-determined value, determining solutions for the code delays in the receiver branches, which include a code delay candidate for the branch to be processed and for in the order of delay preceding branches so that a specific solution is provided for each allowed code delay change in the branch to be processed, the solution including a code delay candidate for the branch to be processed and for the branches preceding said branch, and the solution maximizing the sum of the signal strengths in the branch to be processed and in the preceding branches, with the restriction that in said solution the value of the code delay candidate in the branch to be processed equals at the most the code delay corresponding to said code delay change, and forming said solutions in the order of said allowed maximum delay, and selecting the branch delays in accordance with the last determined solution.

The invention also relates to a method for setting spreading code delays in the RAKE receiver branches, comprising providing a code delay in each branch with a change limit, determining spreading code delay estimates for the branches in the order of delay, determining a code delay estimate for the delay value in a particular branch utilizing code delay estimates in previously determined branches so as to determine a predetermined number of solutions for the delay values in the receiver branches, the solutions comprising a code delay estimate for all branches that have already been processed, and in which solutions the differences between the code delays in the branches exceed a predetermined value, and selecting the code delay estimate in a particular branch among said solutions so that the sum of the signal strengths corresponding to the code delay estimates of the selected solution is the highest, setting the code delays in the branches to correspond with the code delay estimates of the selected solution in the last branch to be determined.

The invention further relates to a RAKE receiver comprising branches. The receiver comprises means for determining the strength of a multipath propagated signal in a set of propagation delay points in the surroundings of each RAKE branch, means for changing the code delay in each branch so that the changed delay is within an area, in which the signal strength can be estimated by virtue of measurements, and restricting the differences between the code delays in the branches to exceed a predetermined value, means arranged to determine solutions for the code delays in the receiver branches that include a code delay candidate for the branch to be processed and for in the order of delay preceding branches so that each allowed code delay change in the branch to be processed is provided with a specific solution, which comprises a code delay candidate for the branch to be processed and for the preceding branches, and which solution maximizes the sum of the signal strengths of the branch to be processed and the branches preceding said branch with the restriction that the value of the code delay candidate in the branch to be processed may at the most be equal to the code delay corresponding to said code delay change and to form said solutions according to the order of the highest delay allowed, and to select the delays in the branches in accordance with the last determined solution.

The invention further relates to a base station, which comprises a RAKE receiver. The base station comprises means for determining the strength of a multipath propagated signal in a set of propagation delay points in the surroundings of each RAKE branch, means for changing the code delay in each branch so that the changed delay is within an area, in which the signal strength can be estimated by virtue of measurements, and restricting the differences between the code delays in the branches to exceed a predetermined value, means arranged to determine solutions for the code delays in the receiver branches that include a code delay candidate for the branch to be processed and for in the order of delay preceding branches so that each allowed code delay change in the branch to be processed is provided with a specific solution, which comprises a code delay candidate for the branch to be processed and for the preceding branches, and which solution maximizes the sum of the signal strengths of the branch to be processed and the branches preceding said branch with the restriction that the value of the code delay candidate in the branch to be processed may at the most be equal to the code delay corresponding to said code delay change and to form said solutions according to the order of the highest delay allowed, and to select the delays in the branches in accordance with the last determined solution.

The invention further relates a user terminal, which comprises a RAKE receiver. The user terminal comprises means for determining the strength of a multipath propagated signal in a set of propagation delay points in the surroundings of each RAKE branch, means for changing the code delay in each branch so that the changed delay is within an area, in which the signal strength can be estimated by virtue of measurements, and restricting the differences between the code delays in the branches to exceed a predetermined value, means arranged to determine solutions for the code delays in the receiver branches that include a code delay candidate for the branch to be processed and for in the order of delay preceding branches so that each allowed code delay change in the branch to be processed is provided with a specific solution, which comprises a code delay candidate for the branch to be processed and for the preceding branches, and which solution maximizes the sum of the signal strengths of the branch to be processed and the branches preceding said branch with the restriction that the value of the code delay candidate in the branch to be processed may at the most be equal to the code delay corresponding to said code delay change and to form said solutions according to the order of the highest delay allowed, and to select the delays in the branches in accordance with the last determined solution.

The invention is based on the idea to take several consecutive samples of a received signal, for example an early, an n-time and a late sample proportioned to the sampling instant. The samples are typically amplitude or power values preferably from the maximum point of the impulse response and from the surroundings thereof. In this method, delay values are determined for RAKE receiver branches by proceeding in the order of delay. Previously determined delay values are utilized for determining new delays.

The method and receiver of the invention provide several advantages. Setting delays in RAKE receiver branches is made faster and calculation capacity is saved, since only some, for example three, samples are used for determining the impulse response of a channel. In addition, if the impulse response is not formed of distinct maximum points, but the impulse response has a broad power maximum, then the set of impulse response measurement results determined on the basis of the multipath propagated signal components received in the branch allow the RAKE branches to be successfully synchronized more optimally, meaning that the energy of a signal received from the radio channel can be maximized. Furthermore, in this method the delays in the different branches are kept at a minimum distance from each other, whereby no diversity amplification is lost. In addition, since each calculation phase utilizes previously formed restricted solutions, the method is close to the optimum as regards the computational complexity.

LIST OF DRAWINGS

The preferred embodiment of the invention will be explained by way of example with reference to the accompanying drawings, in which.

DESCRIPTION OF EMBODIMENTS

The following example describes the preferred embodiments of the invention in an UMTS system (Universal Mobile Telecommunications System) without restricting the invention thereto.

Figure 1:
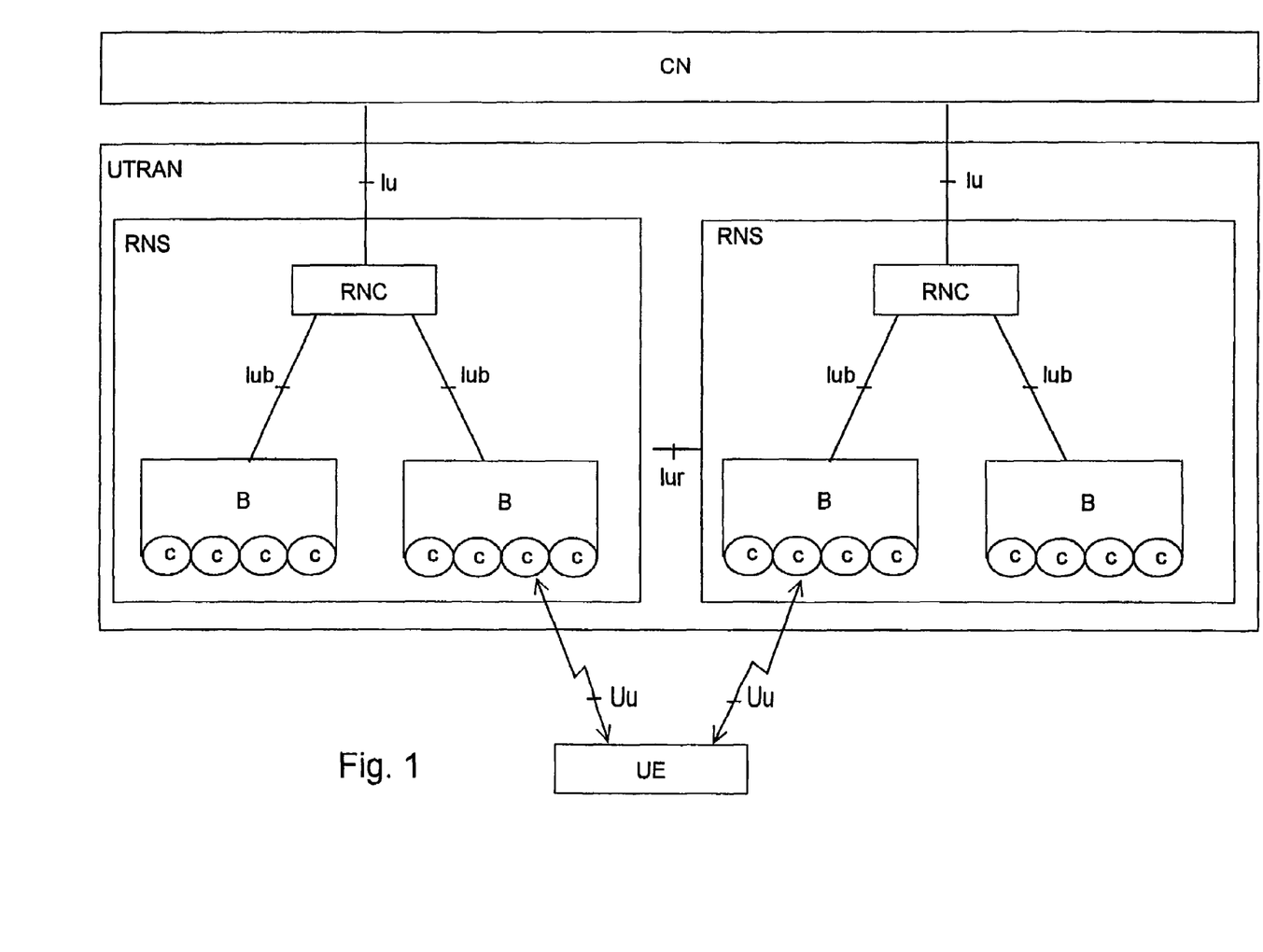
FIG. 1 shows an example of a telecommunication system.

Referring to FIG. 1, the structure of a mobile system is explained by way of example. The main parts of the mobile system include a core network CN, a UMTS terrestrial radio access network UTRAN and user equipment UE. The interface between the CN and the UTRAN is referred to as Iu and the air interface between the UTRAN and the UE is referred to as Uu.

The UTRAN comprises radio network subsystems RNS. The interface between the radio network subsystems RNS is called Iur. An RNS comprises a radio network controller RNC and one or more nodes B. The interface between the RNC and node B is referred to as Iub. The coverage area, or cell, of node B is indicated by letter C in the Figure.

Figure 2:
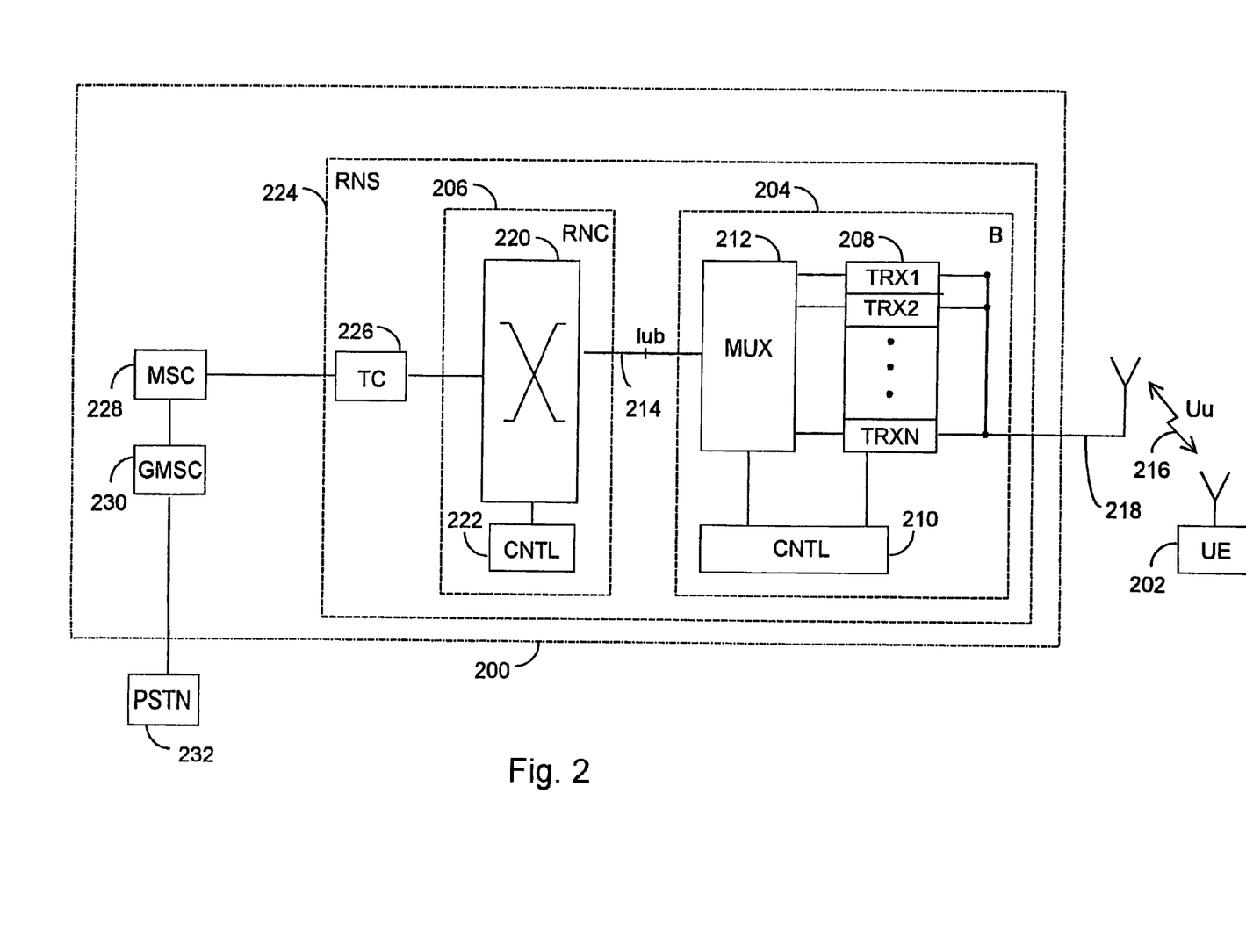
FIG. 2 shows another example of a telecommunication system.

The description shown in FIG. 1 is a fairly general one, and FIG. 2 therefore shows a more detailed example of a cellular radio system. FIG. 2 comprises only the most relevant blocks, but it is apparent for those skilled in the art that a conventional cellular radio network also comprises other functions and structures, which need not be explained in closer detail in this context. The details of the cellular radio system may differ from those shown in FIG. 2, but such differences are irrelevant to the invention.

A cellular radio network comprises a network part 200 and user equipment 202, which can be fixedly located, vehicle-mounted or portable hand-held equipment, such as mobile phones or portable computers, enabling communication with a radio telecommunication system. The network part 200 comprises base transceiver stations 204. A base transceiver station corresponds to node B in the previous Figure. Several base transceiver stations 204, in turn, are controlled in a centralized manner by a radio network controller 206 connected thereto. The base transceiver station 204 comprises transceivers 208 and a multiplexer unit 212.

The base transceiver station 204 further comprises a control unit 210 for controlling the operation of the transceiver 208 and the multiplexer 212. The multiplexer is used for placing the traffic and control channels used by several transceivers 208 to one transmission link 214. The transmission link 214 forms the interface Iub.

The transceivers 208 of the base transceiver station 204 are connected to an antenna unit 218 for implementing a radio connection 216 to the user equipment 202. The structure of frames to be transmitted on the radio connection 216 is determined system-specifically, and referred to as an air interface Uu.

The radio network controller 206 comprises a group-switching field 220 and a control unit 222. The group-switching field 220 is used for switching speech and data and for connecting signalling circuits. A radio network subsystem 224 formed by the base transceiver station 204 and the radio network controller 206 further comprises a transcoder 226. The transcoder 226 is usually located as close to a mobile services switching centre 228 as possible since speech can then be transmitted in the cellular radio network mode between the transcoder 226 and the radio network controller 206, thus saving transmission capacity.

The transcoder 226 converts the different digital speech encoding modes used between the public switched telephone network and the radio phone network into compatible ones, for example from the fixed network mode into another mode of the cellular radio network, and vice versa. The control unit 222 performs call control, mobility management, collection of statistical data and signalling.

FIG. 2 further shows the mobile services switching centre 228 and a gateway mobile services switching centre 230, which is responsible for the connections of the mobile phone system to the outside world, in this case to a public switched telephone network 232.

Figure 3:
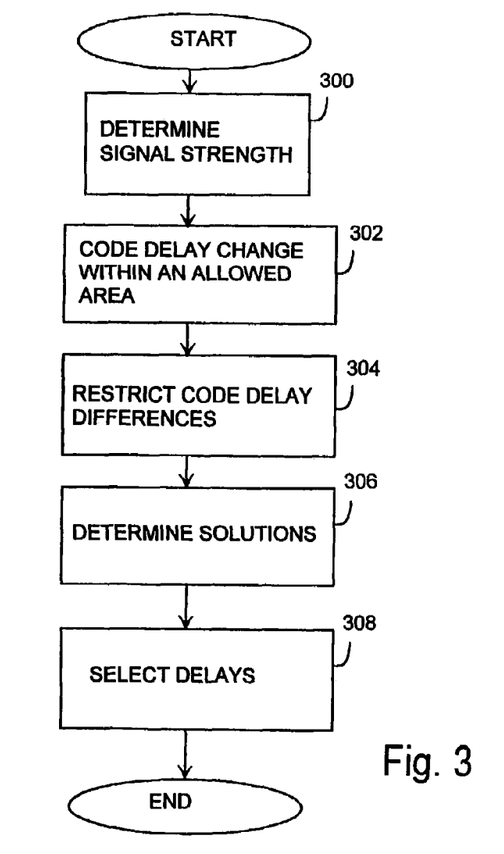
FIG. 3 is a block diagram showing the method steps for setting RAKE branch delays.

Next, the method for setting delays in RAKE receiver branches is explained in more detail in FIG. 3. Setting the delays, or code phases, in the RAKE receiver branches tends to maximize the received signal energy, i.e. power. The method tends to correct the slow change of the propagation delay profile of a radio channel by making minor changes to the delays of the branches (code phases). During the measurement sequence, the power distribution provided by the radio channel is clarified in the proximity of each RAKE branch. After the measurement sequence, the delays in the RAKE branches are changed to correspond more accurately with the change of the power profile observed during measurement, whereafter the following measurement sequence is started using the changed delays in the RAKE branches.

The delays are typically provided with a minimum distance condition, which occasionally is referred to as a minimum delay difference condition. The minimum distance condition determines the lowest possible delay difference in the RAKE branches, which is required, in order for the RAKE branches to receive signals propagated on paths irrespective of one another. Then the signal-to-interference ratio obtained after the maximum ratio combination of the RAKE branches is the sum of separate signal-to-interference ratios of the RAKE branches. The delays are typically calculated in a signal processing processor. Code phases to be searched for or delay values are indicated with symbol $D_i$, when $i=1, \ldots, N$. The code phases adjusted into the RAKE receiver branches are meant to cover as accurately as possible the delay areas, along which the multipath propagated signal arrives at the receiver. In addition, the delays to be searched for must fulfil the minimum distance condition $D_i \geq D_{i-1} + \delta_{min}$, when $i=1, \ldots, N$. Variable $\delta_{min}$ is determined in accordance with the system and signifies the minimum distance condition, i.e. the minimum delay difference, determined for the different branches that allows separating the different signal components from one another.

In step 302, the strength of a multipath-propagated signal is determined in a set of propagation delay points in the surroundings of each RAKE branch. The code delay of each branch is changed 302 at the most so as to remain within the area, in which the signal strength is known by virtue of measurements. The differences between the code delays in the branches are restricted 304 to exceed a predetermined value. In step 306, solutions are determined for the code delays in the receiver branches that include a code delay candidate for branch i and for the branches preceding said branch in the order of delay so that a specific solution $S_A(i)$ is formed for each allowed code delay addition $\Delta$ in branch i. The solution $S_A(i)$ includes a code delay candidate for branch i and for the branches preceding said branch so that it maximizes the sum of signal strengths in branch i and in the preceding branches with the restriction that the value of the code delay candidate $D_i$ in branch i may in the solution $S_A(i)$ be at the most $d_i + \Delta$, where $d_i$ is the current code delay in branch i. If branch i is not the first branch to be processed, the code delays of previous branches belonging to the solution $S_A(i)$ are obtained in the order of delay from the solution $S_X(i-1)$ formed for the previous branch i−1, where X is selected so that it is the highest possible value, in which the difference of the code delay candidates in branch i and in the preceding branch i−1 exceeds the minimum distance, $D_i - D_{i-1} \geq \delta_{min}$. In the last step (308) of the method, the code delays in the branches are read from the solution $S_M(N)$ formed for the last branch N, where M is the highest code delay addition allowed for branch N.

Figure 6:
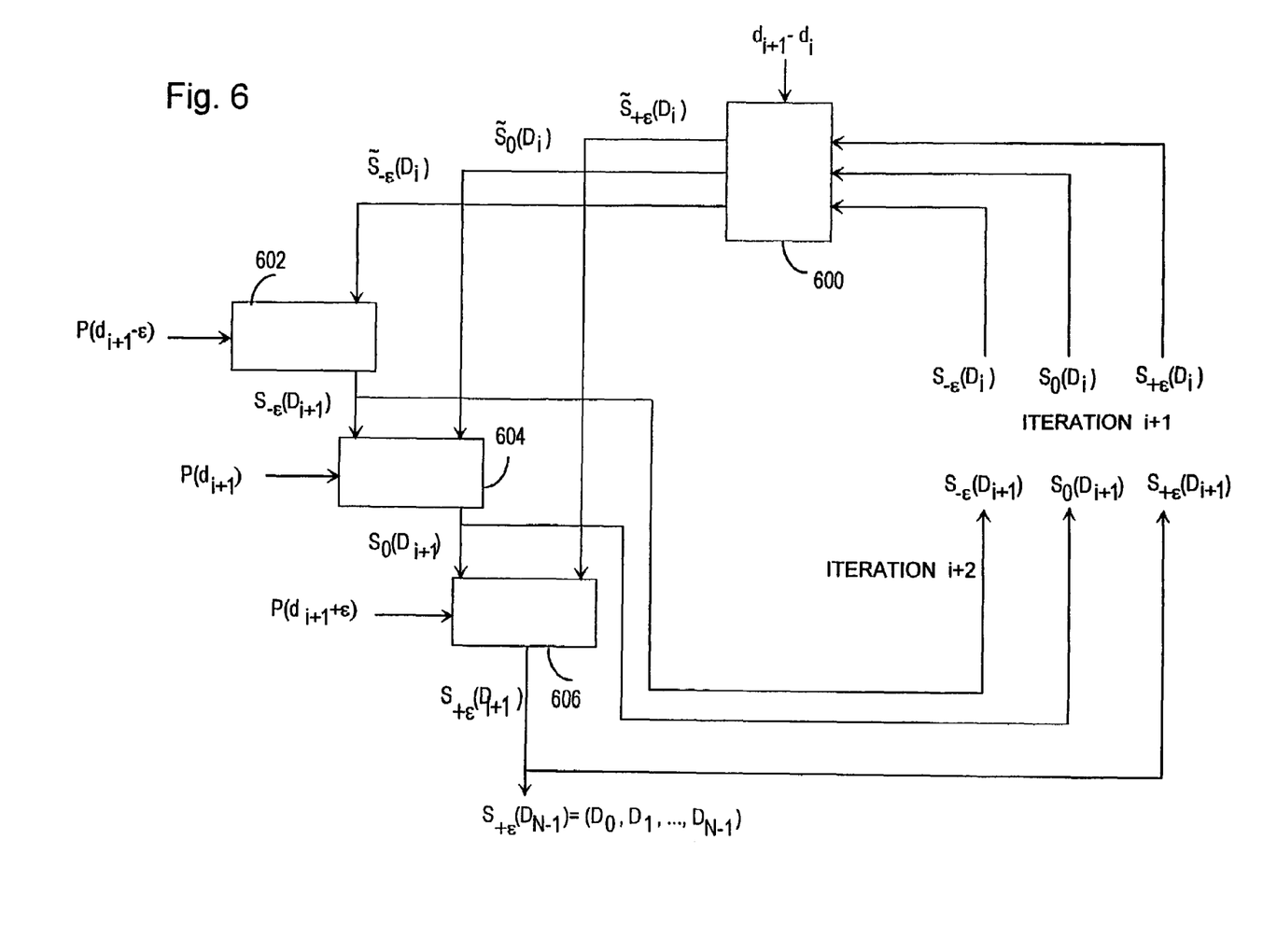
FIG. 6 illustrates the iteration of spreading code delays of the branches.

In the following, the invention will be explained in more detail in the example shown in FIG. 6. In this example, three sets of spreading code delay candidates are formed for branch i, when $i=1, \ldots, N$. The sets are indicated with symbols $S_{-\epsilon}(i)$, $S_0(i)$, and $S_{+\epsilon}(i)$. These sets are formed in block 600. Each set $S_{-\epsilon}(i)$, $S_0(i)$, and $S_{+\epsilon}(i)$ maximizes the combined signal strength of the receiver branches $P(D_1) + P(D_2) + \ldots + P(D_i)$, where the signal strength $P(D_i)$ of the branch refers at delay point $D_i$ to the estimated power, amplitude and energy of the signal or another variable depicting signal strength. The sets comprise the spreading code delay candidates for branch i of the receiver, which is the branch, for which a new delay setting is searched for, as well as for the branches preceding said branch. The code delay candidates in the branches preceding branch i are previously determined either using the method of the invention or another method. Naturally, if branch i is the first branch of the receiver, then no preceding receiver branches exist.

In this example, set $S_{-\epsilon}(i)$ comprises the delay value $D_i=d_i-\epsilon$ of branch i. Set $S_0(i)$ comprises for branch i either the delay value $D_i=d_i$ or the same value as set $S_{-\epsilon}(i)$ depending on which alternative provides a higher received signal power, or power sum. Correspondingly, set $S_{+\epsilon}(i)$ is formed of either delay value $D_i=d_i+\epsilon$, or obtains the same value as set $S_{-\epsilon}(i)$ depending on which alternative provides a higher received signal power, or power sum.

Next, delay candidates are formed for branch i+1, when i=1, . . . , N. The delay candidate sets are indicated with symbols $S_{-\epsilon}(i+1)$, $S_0(i+1)$ and $S_{+\epsilon}(i+1)$. Set $S_{-\epsilon}(i+1)$ is formed in block 602, set $S_0(i+1)$ in block 604 and set $S_{+\epsilon}(i+1)$ in block 606. The sets are formed as follows:

$$S_{-\epsilon}(D_{i+1}+1) = \{\tilde{S}_{-\epsilon}(D_i, d_{i+1}-\epsilon\} \tag{1}$$

$$S_0(D_{i+1}) = \tag{2}$$
$$\begin{cases} \tilde{S}_0(D_i), d_{i+1}, \text{ jos } P(\tilde{S}_0(D_i)) + P(d_{i+1} > P(S_{-\epsilon}(D_{i+1})) \\ S_{-\epsilon}(D_{i+1}), \text{ otherwise} \end{cases}$$

$$S_{+\epsilon}(D_{i+1}) = \tag{3}$$
$$\begin{cases} \tilde{S}_{+\epsilon}(D_i), d_{i+1}+\epsilon, \text{ jos } P(\tilde{S}_0(D_i)) + P(d_{i+1}+\epsilon > P(S_0(D_{i+1})) \\ S_0(D_{i+1}), \text{ otherwise} \end{cases}$$

where $D_{i+1}$ depicts the new delay value of the branch following branch i, $d_{i+1}$ depicts the previous delay value of the branch following branch i, P depicts power (or received signal energy)

$\epsilon$ depicts the change step of the code delay, $\tilde{S}_{-\epsilon}$, $\tilde{S}_0$, $\tilde{S}_{+\epsilon}$ refer to sets formed using sets $S_{-\epsilon}(i)$, $S_0(i)$, and $S_{+\epsilon}(i)$, the formation of which will be explained in the following.

The previously formed sets $S_{-\epsilon}(i)$, $S_0(i)$, and $S_{+\epsilon}(i)$ are utilized for forming sets. Sets $\tilde{S}_{-\epsilon}(i)$, $\tilde{S}_0(i)$ and $\tilde{S}_{+\epsilon}(i)$ are formed at first. Set $\tilde{S}_{-\epsilon}(i)$ is composed of delay candidates for RAKE branch i and for the preceding branches so that the combined received signal energy, or power sum, is the highest possible with the restriction that $D_i \leq d_{i+1}-\delta_{min}-\epsilon$ holds true for the delay $D_i$ in branch i. Set $\tilde{S}_0(i)$ is composed of the delay candidates providing the highest power sum for branch i and for the preceding branches so that $D_i \leq d_{i+1}-\delta_{min}$ holds true for the delay candidate $D_i$. Moreover, set $\tilde{S}_{+\epsilon}(i)$ is correspondingly composed of delays for branch 1 and for the preceding branches, when $D_i \leq d_{i+1}-\delta_{min}+\epsilon$ holds true for the delay candidate $D_i$.

Sets $\tilde{S}_{-\epsilon}(i)$, $\tilde{S}_0(i)$ and $\tilde{S}_{+\epsilon}(i)$ are formed using information concerning sets $S_{-\epsilon}(i)$, $S_0(i)$ and $S_{+\epsilon}(i)$ and the distance $d_{i+1}-d_i$ between branches i and i+1. If branches i and i+1 are placed at a minimum distance from each other, i.e. $d_{i+1}-d_i=\delta_{min}$, then $\tilde{S}_{-\epsilon}(i)=S_{-\epsilon}(i)$, $\tilde{S}_0(i)=S_0(i)$ and $\tilde{S}_{+\epsilon}(i)=S_{+\epsilon}(i)$ are obtained. If $d_{i+1}-d_i=\delta_{min}+\epsilon$, then $\tilde{S}_{-\epsilon(i)=S0}(i)$ and $\tilde{S}_0(i)=$ $\tilde{S}_{+\epsilon}(i)=S_{+\epsilon}(i)$ are correspondingly obtained. If $d_{i+1}-d_i \geq \delta_{min}+2\epsilon$, then $\tilde{S}_{+\epsilon}(i)=\tilde{S}_0(i)=\tilde{S}_{+\epsilon}(i)=S_{+\epsilon}(i)$ is further obtained. Now set $S_{-\epsilon}(i+1)$ can be formed by attaching the delay candidate $D_{i+1}=d_{i+1}-\epsilon$ of branch i+1 to set $\tilde{S}_{-\epsilon}(i)$. After this, set $S_0(i+1)$ can be formed by selecting an alternative providing a higher power sum by comparing set $S_{-\epsilon}(i+1)$ with a set, which is obtained by attaching the delay candidate $D_{i+1}=d_{i+1}$ of branch i+1 to set $\tilde{S}_0(i)$. Furthermore, set $S_{+\epsilon}(i+1)$ can be formed by selecting an alternative providing a higher power sum by comparing set $S_0(i+1)$ and a set, which is obtained by attaching the delay candidate $D_{i+1}=d_{i+1}+\epsilon$ of branch i+1 to set $\tilde{S}_{+\epsilon}(i)$. Set $S_{-\epsilon}(i+1)$ is formed in block 602, set $S_0(i+1)$ in block 604 and set $S_{+\epsilon}(i+1)$ is formed in block 606.

What is formed in this method using known spreading code delay candidates $S_{-\epsilon}(i)$, $S_0(i)$, and $S_{+\epsilon}(i)$ is the following code delay candidates $S_{-\epsilon}(i+1)$, $S_0(i+1)$ and $S_{+\epsilon}(i+1)$, and code delay candidates $S_{-\epsilon}(i+2)$, $S_0(i+2)$ and $S_{+\epsilon}(i+2)$ using code delay candidates $S_{-\epsilon}(i+1)$, $S_0(i+1)$ and $S_{+\epsilon}(i+1)$ and so on. Spreading code delay candidates are formed in a corresponding way for all desired branches in the method.

In block 606, the code delays in the branches are set to correspond with the selected solution in the last determined branch, preferably $S_{+\epsilon}(N)$ code delay candidates, i.e. $S_{+\epsilon}(D_N)=\{D_0, D_1, \ldots, D_N\}$.

It is apparent that the method described above is applicable also when the RAKE branch delay is changed by means of several (or less) steps, for instance steps $-2\epsilon$, $-\epsilon$, 0, $+\epsilon$, $+2\epsilon$, or by means of larger steps, preferably using the multiple $\epsilon$ of the changing step, such as step $2\epsilon$. If the delay is changed using steps $-2\epsilon$, $-\epsilon$, 0, $+\epsilon$, $+2\epsilon$, then five delay candidates, or $S_{-2\epsilon}(i)$, $S_{-\epsilon}(i)$, $S_0(i)$, $S_{+\epsilon}(i)$ and $S_{+2\epsilon}(i)$ are formed by applying the above example of three delay candidates.

The method allows finding a way to provide the highest combined signal strength for updating the delay points (code phases) in the RAKE branches taking into account the minimum distance condition of the RAKE branches, which is required for maximizing the combined signal-to-interference ratio of the RAKE branches, and the amount of required calculation is directly proportional with the number of RAKE branches and each calculation phase utilizes the previously formed restricted solutions.

As an application of the above method, a situation can be mentioned, where the impulse response includes a broad maximum. Thus, the received signal energy can be maximized by setting the delay values of several branches within the area of this maximum, but not necessarily the delay value of any branch at the top of the broad maximum. Another example that can be mentioned is impulse response maximums, which are located close to one another, whereby several receiver branches can be set in such a manner that the received total energy is maximized.

The method ends in block 308. Arrow 310 describes the repeatability of the method starting from the sampling.

Figure 4:
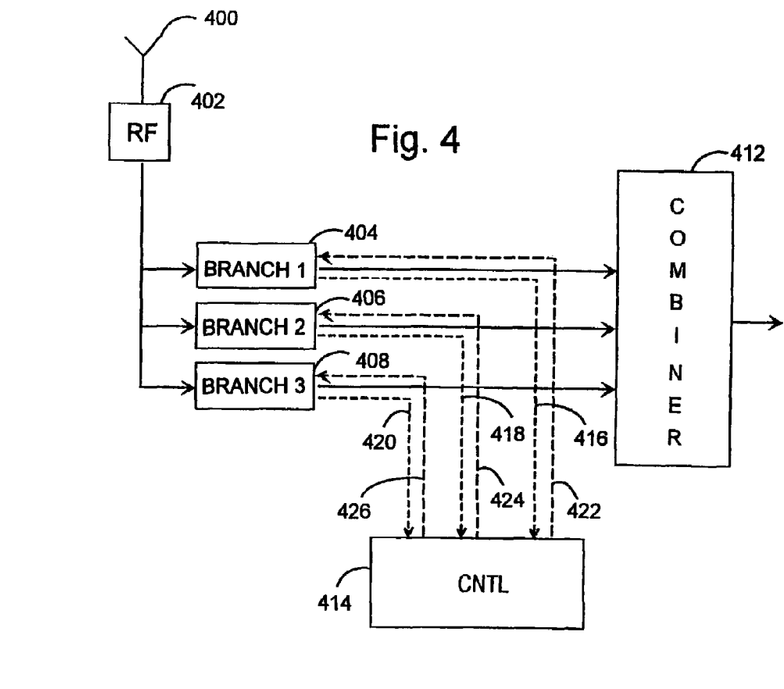
FIG. 4 shows an example of a RAKE receiver.

FIG. 4 illustrates by way of example a part of the RAKE receiver. The RAKE receiver shown in this example comprises three correlator branches 404, 406 and 408. The number of branches may deviate from the one shown. Each signal component delayed in different ways and received by an antenna or antenna group 400 and filtered in radio frequency parts 402 and down-converted to baseband is applied to a specific receiver branch. The receiver shown also comprises a diversity combiner 412 that combines the signal components of the different branches delayed in different ways. In the example solution shown in the Figure, a control unit 414 comprises an adjustment facility of the code phase.

Signals 416, 418 and 420 transmit the samples taken in each branch to the control unit. Signals 422, 424 and 426 transmit to each branch a control signal if necessary for adjusting the delay value of the branch.

Figure 5:
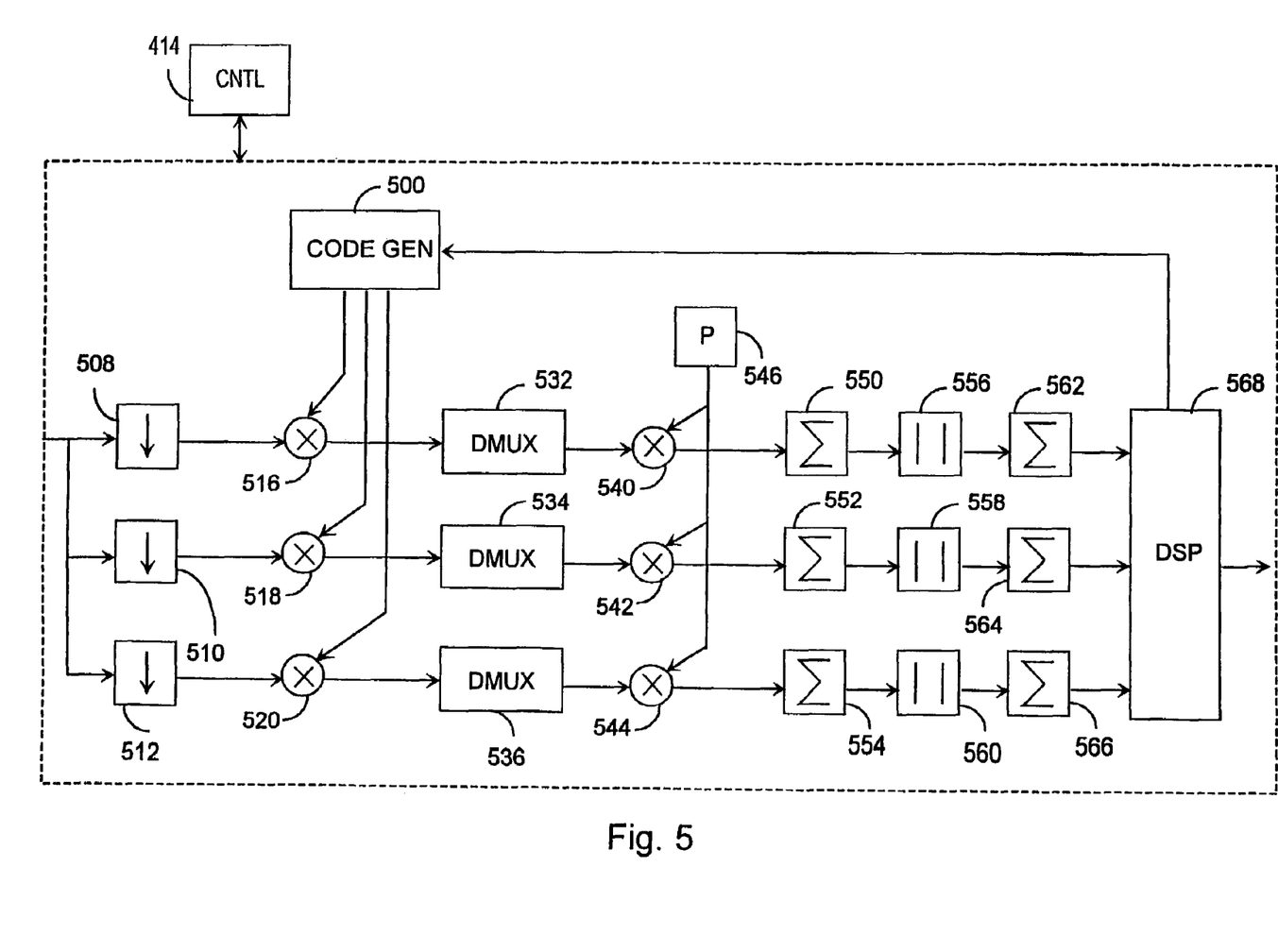
FIG. 5 shows an example of the structure of a RAKE branch for setting delays.

Next, an example is explained in FIG. 5 showing the structure of a RAKE branch. What is concerned is a direct sequence DS receiver for receiving a direct spread signal.

In the receiver branch according to the described example, three samples are taken from the signal component. It should, however, be noted that the number of samples may deviate from the one mentioned. The sampling means 508, 510 and 512 are provided with a complex baseband signal of broadband type, which is preferably desimated in such a manner that a sample is taken from each chip. A sampling means 510 is assumed to be well timed based on the code tracking, meaning that a sampling instant is determined for the sampling means 510 so that the sampling takes place at an instant, which based on the code tracking is determined as the most probable time of occurrence of the highest value of the impulse response. The sampling instant of the sampling means 508 is delayed preferably by one sampling instant compared to the sampling instant of the sampling means 510 and the sampling instant of the sampling means 512 is preferably advanced one sampling instant compared to the sampling instant of the sampling means 510. Three samples are thus obtained, which here are referred to as early, in-time and late samples.

In order to compose the received signal into narrowband, the sampled signals are multiplied by a spreading code sequence generated by a code generator 500. Each sample, early, in-time and late, can be provided with a separately determined spreading code delay.

After this, in the solution shown in FIG. 5, pilot symbols are separated from the signals using demultiplexers 532, 534 and 536. Next, the pilot symbols are multiplied in multipliers 540, 542 and 544 using the complex conjugates of the pilot symbols, which are formed in block 546 and integrated in blocks 550, 552, 554 by the amount of time-slot-specific pilot symbols, meaning that the pilot symbols are filtered using an arranged filter for determining the multipath delay profile of the radio channel. The multipath delay profile may also be averaged. Envelope detectors 556, 558 and 560 are used to determine the amplitude and power of a complex signal. A square-law detector can be used instead of an envelope detector.

Integration is carried out in blocks 562, 564 and 566 for removing noise. After this, the amplitude or power values are applied to a signal processing processor 568, in which the setting commands of the spreading code phase, i.e. the spreading code delay, are determined, which are used to control the code generator 500. The setting method of the code phase has previously been explained. In the example shown in FIG. 5, the control unit 414 in FIG. 4 is included in the signal processing processor. The control unit can also be implemented using separate components or using another similar method. The signal processing processor also carries out other signal processing measures, such as coding.

It should be noted that the method for setting delays can also be applied without using the pilot signal in such a manner that the information required for synchronizing the sampling instant or the code phase is obtained by processing the data signal in a similar manner as the pilot signal previously.

The above-described functional blocks, such as the control unit of the code phase, can be implemented in many ways, for instance using software run by a processor or a hardware configuration, such as a logic built using separate components, ASIC (Application Specific Integrated Circuit) or a combination thereof.

Although the invention has been described above with reference to the example according to the accompanying drawings, it is obvious that the invention is not restricted thereto but can be varied in many ways within the scope of the inventive idea disclosed in the attached claims.

The invention claimed is:

1. A method, comprising:
determining a strength of a multipath propagated signal in a set of propagation delay points in the surroundings of each of a plurality of RAKE receiver branches,
restricting a code delay change in each RAKE receiver branch so that the changed code delay is within an area, in which the signal strength can be estimated by virtue of measurements,
restricting differences between the code delays in the RAKE receiver branches to exceed a predetermined value,
determining solutions for the code delays in the RAKE receiver branches, the solutions comprising a code delay candidate for a RAKE receiver branch to be processed for an order of delay preceding RAKE receiver branches so that
a specific solution is provided for each allowed code delay change in the RAKE receiver branch to be processed, the specific solution comprising a code delay candidate for the branch to be processed and for the RAKE receiver branches preceding the RAKE receiver branch to be processed, and the specific solution maximizing a sum of the signal strengths in the RAKE receiver branch to be processed and in the preceding RAKE receiver branches, with the restriction that in said specific solution a value of the code delay candidate in the RAKE receiver branch to be processed equals at the most a code delay corresponding to said code delay change, and forming said solutions in the order of an allowed maximum delay, and
selecting the code delays in the RAKE receiver branches in accordance with a last determined solution.

2. The method as claimed in claim 1, wherein the restricting the differences comprises restricting a value of the differences between the code delays in the RAKE receiver branches comprising at least a pre-set minimum distance.

3. The method as claimed in claim 1, further comprising: obtaining, when RAKE receiver branch i (where I=1, . . ., N) to be processed is not a first RAKE receiver branch to be processed, the code delays of previous RAKE receiver branches included in said specific solution in the order of delay from a solution $S_x(i-1)$ formed for a previous RAKE receiver branch, where X is selected so that it is the highest possible value, by which the difference between the code delay candidates in branch i and in branch i−1 preceding said RAKE receiver branch exceeds a pre-set minimum distance.

4. The method as claimed in claim 1, wherein the restricting the differences comprises restricting the differences between the code delays in the RAKE receiver branches at a minimum distance $\delta_{min}$ of the RAKE receiver branches in relation to a duration $T_c$ of a spreading code chip so that $\delta_{min}=3T_c/4$.

5. The method as claimed in claim 1, wherein the restricting the differences comprises restricting the differences between the code delays in the RAKE receiver branches at a minimum distance of the RAKE receiver branches equalling a length of a spreading code chip.

6. The method as claimed in claim 1, wherein the selecting the code delays in the RAKE receiver branches comprises setting the code delays of the RAKE receiver branches in a RAKE receiver read from a solution $S_M(N)$ formed for the last RAKE receiver branch N to be processed, where M is a maximum code delay addition allowed for RAKE receiver branch N.

7. A method, comprising:
determining a strength of a multipath propagated signal in a set of propagation delay points in the surroundings of each of a plurality of RAKE receiver branches,
restricting a code delay change in each RAKE receiver branch so that the changed code delay is within an area, in which the signal strength can be estimated by virtue of measurements,
restricting differences between the code delays in the RAKE receiver branches to exceed a predetermined value,
determining solutions for the code delays in the RAKE receiver branches, the solutions comprising a code delay candidate for a RAKE receiver branch to be processed and for an order of delay preceding RAKE receiver branches so that a specific solution is provided for each allowed code delay change in the RAKE receiver branch to be processed, the specific solution comprising a code delay candidate for the RAKE receiver branch to be processed and for the RAKE receiver branches preceding the RAKE receiver branch to be processed, and the specific solution maximizing a sum of the signal strengths in the RAKE receiver branch to be processed and in the preceding RAKE receiver branches, with the restriction that in the specific solution a value of the code delay candidate in the RAKE receiver branch to be processed equals at the most a code delay corresponding to the code delay change, and forming the solutions in an order of the allowed maximum delay,
selecting the code delays in the RAKE receiver branches in accordance with a last determined solution,
providing a code delay in the RAKE receiver branches with an adjustment step $\epsilon$,
allowing values $-\epsilon$, 0, and $+\epsilon$ for the code delay addition in each branch and
estimating a strength of a received signal at the delay points, the received signal configured with added values of the allowed code delay.

8. The method as claimed in claim 7, wherein the providing a code delay in the RAKE receiver branches with the adjustment step $\epsilon$ of the code delay in the RAKE receiver branches being in relation to a duration $T_c$ of a spreading code chip so that $\epsilon=T_c/8$.

9. The method as claimed in claim 7, wherein the providing a code delay in the RAKE receiver branches with the adjustment step $\epsilon$ of the code delay in the RAKE receiver branches being in relation to a duration $T_c$ of a code chip so that $\epsilon=T_c/16$.

10. A method, comprising:
providing a code delay in each of a plurality of RAKE receiver branches with a change limit,
determining spreading code delay estimates for the RAKE receiver branches in an an order of delay,
determining a code delay estimate for the code delay value in a particular RAKE receiver branch utilizing the spreading code delay estimates in previously determined RAKE receiver branches so as to determine a predetermined number of solutions for the code delay values in the RAKE receiver branches, the solutions comprising code delay estimates for all RAKE receiver branches that have already been processed, and in which the differences between the code delays in the RAKE receiver branches exceed a predetermined value, and select the code delay estimate in a particular RAKE receiver branch among the solutions so that a sum of signal strengths corresponding to the code delay estimates of a selected solution is the highest, and
setting the code delays in the RAKE receiver branches to correspond with the code delay estimates of the selected solution in last branch to be determined.

11. A RAKE receiver, the receiver comprising:
measurement means for determining a strength of a multipath propagated signal in a set of propagation delay points in the surroundings of each RAKE branch,
restriction means for changing a code delay in each RAKE branch so that the changed code delay is within an area, in which the signal strength can be estimated by virtue of measurements, and for restricting differences between the code delays in RAKE branches to exceed a predetermined value, and
determination means for determining solutions for the code delays in the RAKE branches comprising a code delay candidate for the RAKE branch to be processed and for an order of delay preceding RAKE branches so that each allowed code delay change in the RAKE branch to be processed is provided with a specific solution comprising a code delay candidate for the RAKE branch to be processed and for the preceding RAKE branches, and which the specific solution maximizes a sum of the signal strengths of the RAKE branch to be processed and the RAKE branches preceding the RAKE branch with the restriction that the value of a code delay candidate in the RAKE branch to be processed may at the most be equal to a code delay corresponding to the code delay change;
forming the solutions according to an order of a highest delay allowed; and
selecting the code delays in the RAKE branches in accordance with a last determined solution.

12. The RAKE receiver of claim 11, further comprising:
setting means to set at least a predetermined minimum distance as a difference of the code delays in the RAKE branches.

13. The RAKE receiver of claim 11, further comprising:
setting means to set $\delta_{min}=3T_c/4$, where $T_c$ is a duration of a spreading code chip, as a minimum distance of the RAKE branches.

14. The RAKE receiver of claim 11, further comprising:
setting means to set a value for a minimum distance of the RAKE branches that equals a duration of a spreading code chip.

15. A base station, comprising:
a RAKE receiver,
measurement means for determining a strength of a multipath propagated signal in a set of propagation delay points in the surroundings of each RAKE receiver branch,
restriction means for changing a code delay in each RAKE receiver branch so that the changed code delay is within an area, in which the signal strength can be estimated by virtue of measurements, and for restricting differences between the code delays in the RAKE receiver branches to exceed a predetermined value, and determination means for determining solutions for the code delays in the RAKE receiver branches comprising a code delay candidate for a RAKE receiver branch to be processed and for an order of delay preceding RAKE receiver branches so that each allowed code delay change in the RAKE receiver branch to be processed is provided with a specific solution, comprising a code delay candidate for the RAKE receiver branch to be processed and for the preceding RAKE receiver branches, and which the specific solution maximizes a sum of the signal strengths of the RAKE receiver branch to be processed and the RAKE receiver branches preceding the RAKE receiver branch to be processed with the restriction that a value of the code delay candidate in the RAKE receiver branch to be processed may at the most be equal to a code delay corresponding to a code delay change; for forming the solutions according to an order of the highest delay allowed; and for selecting delays in the RAKE receiver branches in accordance with a last determined solution.

16. The base station of claim 15, further comprising:
setting means to set at least a predetermined minimum distance as a difference of the code delays in the RAKE receiver branches.

17. The base station of claim 15, further comprising:
setting means to set $\delta_{min}=3T_c/4$, where $T_c$ is a duration of a spreading code chip, as a minimum distance of the RAKE receiver branches.

18. The base station of claim 15, further comprising:
setting means to set a value for a minimum distance of the RAKE receiver branches that equals a duration of a spreading code chip.

19. A user terminal, comprising:
a RAKE receiver,
measurement means for determining a strength of a multipath propagated signal in a set of propagation delay points in the surroundings of each RAKE receiver branch,
restriction means for changing a code delay in each RAKE receiver branch so that the changed code delay is within an area, in which the signal strength can be estimated by virtue of measurements, and for restricting differences between the code delays in RAKE receiver branches to exceed a predetermined value, and
determination means for determining solutions for the code delays in the RAKE receiver branches comprising a code delay candidate for a RAKE receiver branch to be processed and for an order of delay preceding RAKE receiver branches so that each allowed code delay change in the RAKE receiver branch to be processed is provided with a specific solution comprising a code delay candidate for the RAKE receiver branch to be processed and for the preceding RAKE receiver branches, and which the specific solution maximizes a sum of the signal strengths of the RAKE receiver branch to be processed and the RAKE receiver branches preceding the RAKE receiver branch with the restriction that a value of the code delay candidate in the RAKE receiver branch to be processed may at the most be equal to a code delay corresponding to the code delay change, for forming the solutions according to an order of the highest delay allowed, and for selecting the code delays in the RAKE receiver branches in accordance with a last determined solution.

20. The user terminal of claim 19, further comprising:
setting means to set at least a predetermined minimum distance as a difference of the code delays in the RAKE receiver branches.

21. The user terminal of claim 19, further comprising:
setting means to set $\delta_{min}=3T_c/4$, where $T_c$ is a duration of a spreading code chip, as a minimum distance of the RAKE receiver branches.

22. The user terminal of claim 19, further comprising:
setting means to set a value for a minimum distance of the RAKE receiver branches that equals the duration of a spreading code chip.

23. A RAKE receiver, comprising:
a measuring unit configured to determine a strength of a multipath propagated signal in a set of propagation delay points in the surroundings of each RAKE receiver branch,
a restricting unit configured to change a code delay in each RAKE receiver branch so that the changed code delay is within an area, in which the signal strength can be estimated by virtue of measurements, and for restricting differences between the code delays in the RAKE receiver branches to exceed a predetermined value, and
a processor configured to determine solutions for the code delays in the RAKE receiver branches comprising a code delay candidate for a RAKE receiver branch to be processed and for an order of delay preceding RAKE receiver branches so that each allowed code delay change in the RAKE receiver branch to be processed is provided with a specific solution-comprising a code delay candidate for the RAKE receiver branch to be processed and for the preceding RAKE receiver branches, and which solution maximizes a sum of the signal strengths of the RAKE receiver branch to be processed and the RAKE receiver branches preceding the RAKE receiver branch to be processed with the restriction that the value of a code delay candidate in the RAKE receiver branch to be processed may at the most be equal to a code delay corresponding to the code delay change; to form the solutions according to an order of a highest code delay allowed; and to select the code delays in the RAKE receiver branches in accordance with a last determined solution.

24. The RAKE receiver of claim 23, further comprising:
a setting unit configured to set at least a predetermined minimum distance as a difference of the code delays in the RAKE receiver branches.

25. The RAKE receiver of claim 23, further comprising:
a setting unit configured to set $\delta_{min}=3T_c/4$, where $T_c$ is a duration of a spreading code chip, as a minimum distance of the RAKE receiver branches.

26. The RAKE receiver of claim 23, further comprising:
a setting unit configured to set a value for a minimum distance of the RAKE receiver branches that equals a duration of a spreading code chip.

27. A base station, comprising:
a RAKE receiver,
a measurement unit configured to determine a strength of a multipath propagated signal in a set of propagation delay points in the surroundings of each RAKE receiver branch,
a restricting unit configured to restrict a code delay in each RAKE receiver branch so that the changed code delay is within an area, in which the signal strength can be estimated by virtue of measurements, and for restricting differences between the code delays in RAKE receiver branches to exceed a predetermined value, and a processor configured to determine solutions for the code delays in the RAKE receiver branches comprising a code delay candidate for a RAKE receiver branch to be processed and for an order of delay preceding RAKE receiver branches so that each allowed code delay change in the RAKE receiver branch to be processed is provided with a specific solution comprising a code delay candidate for the RAKE receiver branch to be processed and for the preceding RAKE receiver branches, and which the specific solution maximizes a sum of the signal strengths of the RAKE receiver branch to be processed and the RAKE receiver branches preceding the RAKE receiver branch to be processed with the restriction that a value of the code delay candidate in the RAKE receiver branch to be processed may at the most be equal to a code delay corresponding to a code delay change, to form the solutions according to an order of the highest code delay allowed, and to select delays in the RAKE receiver branches in accordance with a last determined solution.

28. A user terminal, comprising:

a RAKE receiver, a measuring unit configured to determine a strength of a multipath propagated signal in a set of propagation delay points in the surroundings of each RAKE receiver branch, a restricting unit configured to change a code delay in each RAKE receiver branch so that the changed code delay is within an area, in which the signal strength can be estimated by virtue of measurements, and for restricting differences between the code delays in RAKE receiver branches to exceed a predetermined value, and a processor configured to determine solutions for the code delays in the RAKE receiver branches comprising a code delay candidate for a RAKE receiver branch to be processed and for an order of delay preceding RAKE receiver branches so that each allowed code delay change in the RAKE receiver branch to be processed is provided with a specific solution comprising a code delay candidate for the RAKE receiver branch to be processed and for the preceding RAKE receiver branches, and which the specific solution maximizes a sum of the signal strengths of the RAKE receiver branch to be processed and the RAKE receiver branches preceding the RAKE receiver branch to be processed with the restriction that a value of the code delay candidate in the RAKE receiver branch to be processed may at the most be equal to a code delay corresponding to the code delay change, to form the solutions according to an order of the highest delay allowed, and to select the code delays in the RAKE receiver branches in accordance with a last determined solution.

* * * * *